(12) United States Patent
Rawson, III

(10) Patent No.: US 7,539,841 B2
(45) Date of Patent: *May 26, 2009

(54) MACHINE MEMORY POWER AND AVAILABILITY MANAGEMENT IN A PROCESSING SYSTEM SUPPORTING MULTIPLE VIRTUAL MACHINES

(75) Inventor: Freeman Leigh Rawson, III, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 3 days.

This patent is subject to a terminal disclaimer.

(21) Appl. No.: 12/030,837

(22) Filed: Feb. 13, 2008

(65) Prior Publication Data

US 2008/0147956 A1   Jun. 19, 2008

Related U.S. Application Data

(63) Continuation of application No. 10/738,719, filed on Dec. 17, 2003, now Pat. No. 7,356,665.

(51) Int. Cl.
*G06F 9/26* (2006.01)
(52) U.S. Cl. .................. 711/202; 709/213; 709/205
(58) Field of Classification Search .............. 711/202; 709/213, 205
See application file for complete search history.

(56) References Cited

U.S. PATENT DOCUMENTS

| 5,148,546 | A | 9/1992 | Blodgett |
|---|---|---|---|
| 5,404,543 | A | 4/1995 | Faucher et al. |
| 5,586,297 | A | 12/1996 | Bryg et al. |
| 5,623,647 | A | 4/1997 | Maitra et al. |
| 5,948,112 | A | 9/1999 | Shimada et al. |
| 6,128,641 | A | 10/2000 | Fleck et al. |
| 6,131,166 | A | 10/2000 | Wong-Insley |
| 6,182,089 | B1 | 1/2001 | Ganapathy et al. |
| 6,298,063 | B1 | 10/2001 | Coile et al. |
| 6,330,639 | B1 | 12/2001 | Fanning et al. |
| 6,512,652 | B1 | 1/2003 | Nelson et al. |
| 6,657,634 | B1 | 12/2003 | Sinclair et al. |
| 6,704,877 | B2 | 3/2004 | Cline et al. |
| 6,776,787 | B2 | 8/2004 | Phung et al. |
| 6,834,353 | B2 | 12/2004 | Smith et al. |

(Continued)

*Primary Examiner*—Tuan V Thai
*Assistant Examiner*—Yong Choe
(74) *Attorney, Agent, or Firm*—Mitch Harris, Atty at Law, LLC; Andrew M. Harris; Casimer K. Salys

(57) ABSTRACT

A processing system and computer program provides memory power management and memory failure management in large scale systems. Upon a decision to take a memory module off-line or place the module in an increased-latency state for power management, or upon a notification that a memory module has failed or been taken off-line or has had latency increased by another power management control mechanism, a hypervisor that supports multiple virtual machines checks the use of pages by each virtual machine and its guest operating system by using a reverse mapping. The hypervisor determines which virtual machines are using a particular machine memory page and may re-map the machine memory page to another available machine page, or may notify the virtual machines that the memory page has become or is becoming unavailable via a fault or other notification mechanism. Alternatively, or in the absence of a response from a virtual machine, the hypervisor can shut down the affected partition(s).

20 Claims, 3 Drawing Sheets

U.S. PATENT DOCUMENTS

| | | |
|---|---|---|
| 6,895,506 B1 | 5/2005 | Abu-Husein |
| 6,996,441 B1 | 2/2006 | Tobias |
| 7,000,130 B2 | 2/2006 | Adachi |
| 2002/0004913 A1 | 1/2002 | Fung |
| 2002/0026601 A1 | 2/2002 | Shiraga et al. |
| 2003/0110205 A1 | 6/2003 | Johnson |
| 2003/0210247 A1 | 11/2003 | Cui et al. |
| 2004/0044914 A1 | 3/2004 | Gedeon |
| 2004/0083478 A1 | 4/2004 | Chen et al. |
| 2004/0236896 A1 | 11/2004 | Kanapathippillai et al. |
| 2004/0260957 A1 | 12/2004 | Jeddeloh et al. |
| 2005/0076324 A1 | 4/2005 | Lowell et al. |
| 2005/0091652 A1 | 4/2005 | Ross et al. |
| 2005/0125701 A1 | 6/2005 | Van Hensbergen et al. |
| 2005/0125702 A1 | 6/2005 | Keller et al. |
| 2005/0125703 A1 | 6/2005 | Lefurgy et al. |
| 2005/0132238 A1 | 6/2005 | Nanja |
| 2005/0138442 A1 | 6/2005 | Keller et al. |

MACHINE MEMORY POWER AND AVAILABILITY MANAGEMENT IN A PROCESSING SYSTEM SUPPORTING MULTIPLE VIRTUAL MACHINES

The present application is a Continuation of U.S. patent application Ser. No. 10/738,719, filed on Dec. 17, 2003 now U.S. Pat. No. 7,356,665.

CROSS-REFERENCE TO RELATED APPLICATIONS

The present application is related to previously-filed co-pending U.S. patent application Ser. No. 10/727,319, entitled "METHOD AND SYSTEM FOR POWER MANAGEMENT INCLUDING DEVICE CONTROLLER-BASED DEVICE USE EVALUATION AND POWER-STATE CONTROL" and Ser. No. 10/727,320 entitled "METHOD AND SYSTEM FOR POWER MANAGEMENT INCLUDING LOCAL BOUNDING OF DEVICE GROUP POWER CONSUMPTION" and issued as U.S. Pat. No. 7,155,623 on Dec. 26, 2006, both of which were filed on Dec. 3, 2003, the specifications of which were incorporated by reference in U.S. Parent patent application Ser. No. 10/738,719, are also thereby incorporated by reference herein.

BACKGROUND OF THE INVENTION

1. Technical Field

The present invention relates generally to memory control and management in processing systems, and more particularly, to a reverse memory mapping scheme that permits power and failure management in a processing system running multiple virtual machines.

2. Description of the Related Art

Present-day computing systems, and in particular large-scale server systems, often include support for running multiple virtual machines. The system may be a large-scale on-demand server system that executes hundreds of server instances on a single hardware platform to support customers with varying computing requirements. In the most flexible of these systems, multiple partitions, which may differ in operating system and application mix, are concurrently present in system memory and processes executing in each partition are run in an environment that supports their execution on a guest operating system. The virtual machine provides an environment similar enough to a real hardware platform that the operating system can run with little or no modification. A hypervisor (sometimes referred to as a virtual machine monitor) manages all of the virtual machines or partitions and abstracts system resources so that each partition provides a machine-like environment to each operating system instance.

Part of the above-mentioned abstraction is provided by a memory management scheme that provides not only virtual memory management in the traditional sense, but one or more additional virtualization layers that enable the hypervisor to provide a virtualized address space for each virtual machine, referred to as its physical address space. Typically, each physical partition has a zero-based physical memory that the associated operating system instance can use as it would a hardware memory. The collection of physical address spaces is then managed by the hypervisor. To reduce the overall amount of hardware memory needed and to maximize utilization of hardware memory, the hypervisor typically uses a number of memory management techniques. For example, the hypervisor may map physical pages of different virtual machines that contain the same content to the same hardware page.

The above-incorporated patent applications disclose various mechanisms for power management that include memory consolidation and hardware and/or software mechanisms that provide decision making tools for taking a memory module off-line to conserve power. In some cases, the decision is made by an entity independent from the hypervisor or other system software, such as the power management mechanism described in the above-incorporated patent application "METHOD AND SYSTEM FOR POWER MANAGEMENT INCLUDING DEVICE CONTROLLER-BASED DEVICE USE EVALUATION AND POWER-STATE CONTROL", where a memory module may be taken off-line (placed in a power off state) or placed in a power-saving mode having high latency such as self-refresh mode, without direct instruction by the system software. In the above-incorporated patent application "METHOD AND SYSTEM FOR POWER MANAGEMENT INCLUDING LOCAL BOUNDING OF DEVICE GROUP POWER CONSUMPTION", a mechanism for local group control of power management states, a memory controller, or other higher level device controller such as a synchronous memory interface (SMI) may control the power management state of memory modules, to enforce local limits on power consumption.

If the hypervisor controls the decision in memory module power management as to whether a particular memory module is taken off-line or placed in a high-latency power-saving state, it must know what virtual machines are using pages within the memory module in order to intelligently prioritize the power management decisions. For example, it would be desirable for the hypervisor to take away memory from virtual machines running less important systems, rather than taking memory from more important systems.

Also, if a memory module or portion of a memory module fails, the hypervisor must also be aware of what virtual machines are using affected pages, and it would further be desirable for the hypervisor to be able to notify the guest operating system which physical page(s) have failed.

Therefore, it would be desirable to provide a mechanism for managing machine memory availability in a processing system supporting multiple virtual machines for both memory failure and power management purposes. It would further be desirable to provide a mechanism by which a hypervisor can discover memory use by one or more partitions within the processing system based on the machine address range of a module or page that has failed, or a module that is being taken off-line, or a module that is placed in a high-latency power saving state.

SUMMARY OF THE INVENTION

The objective of providing a mechanism for managing machine memory availability in a processing system supporting multiple virtual machines for both memory failure and power management purposes is provided in a method, system and computer program product that use a reverse mapping scheme to discover the virtual machines using one or more particular machine memory pages.

A reverse mapping structure is maintained by a hypervisor program executing within the processing system that implements methods in accordance with embodiments of the present invention. The hypervisor program forms a computer program product in accordance with an embodiment of the present invention when stored on media, in a memory, or transferred through a signaling mechanism such as a network download transmission. The reverse mapping structure maps machine memory blocks within the processing system to physical memory blocks within the multiple virtual machines. The machine memory blocks represent actual system memory, although the machine memory blocks may be virtualized or re-mapped at a lower level, for example by a memory controller. The physical memory blocks represent the system memory as presented to each virtual machine, so that an expected memory architecture is presented to each virtual machine. The reverse mapping structure permits discovery of which virtual machines (affected virtual machines) are using a machine memory block and what the physical block number and/or address is for each affected virtual machine.

When a particular machine memory block becomes or is becoming unavailable due to a memory failure or because the memory block is to be taken off-line (or operated with reduced power/performance) for power management purposes, the hypervisor determines that the block will be slower or unavailable, reads the reverse mapping structure to determine the affected virtual machines and indicia of the physical memory blocks mapped to the particular machine memory block within the affected virtual machines. The hypervisor then takes action on each of the virtual machines, either notifying them of the unavailability of the associated physical memory blocks, mapping the physical memory block to another unaffected machine memory block or performing supervisory action such as shutting down the affected virtual machines.

The foregoing and other objectives, features, and advantages of the invention will be apparent from the following, more particular, description of the preferred embodiment of the invention, as illustrated in the accompanying drawings.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of an illustrative embodiment when read in conjunction with the accompanying drawings, wherein like reference numerals indicate like components, and:

DESCRIPTION OF ILLUSTRATIVE EMBODIMENT

Figure 1:
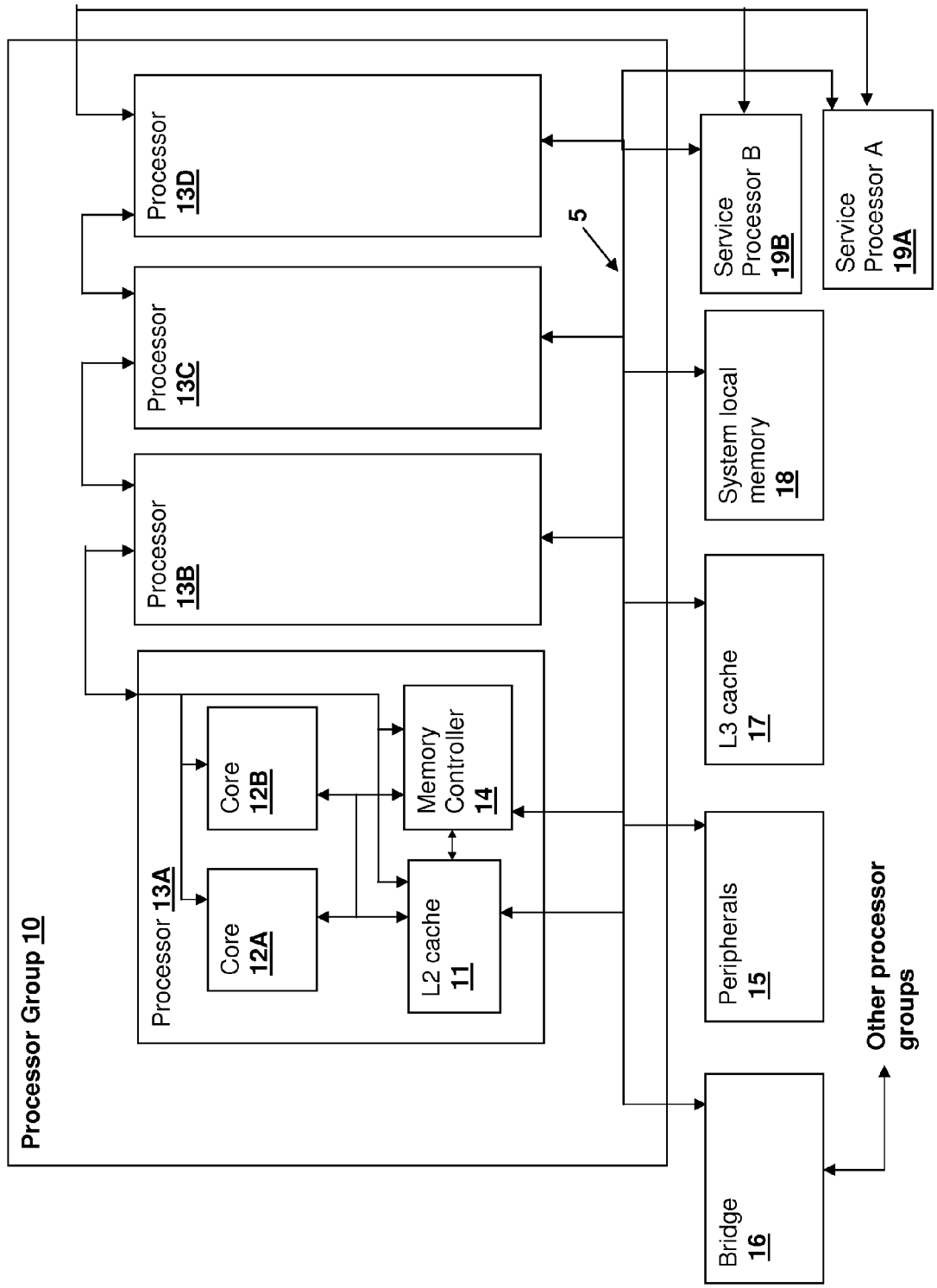
FIG. 1 is a block diagram of a computing system in which an embodiment of the invention is practiced.

With reference now to the figures, and in particular with reference to FIG. 1, there is depicted a block diagram of a processing system in which an embodiment of the present invention is practiced. It should be understood that the depicted embodiment is not intended to be limiting, but only exemplary of the type of processing system to which the methods and techniques of the present invention may be applied. The system includes a processor group 10 having four processors 13A-D. Processor group 10 may be connected to other processor groups via a bridge 16 forming a super-scalar processor. Processor group 10 is connected to an L3 cache unit 17, system local memory 18 and various peripherals 15, as well as to two service processors 19A and 19B. Service processors 19A-B provide fault supervision, startup assistance and test capability to processor group 10 and may have their own interconnect paths to other processor groups as well as connecting to all of processors 13A-D.

Within processor group 10 are a plurality of processors 13A-D, each generally fabricated in a single unit and including a plurality of processor cores 12A and 12B coupled to an L2 cache 11 and a memory controller 14. Memory controller 14 may be of a type as disclosed in the above-referenced patent applications, and thus provides usage information and optionally local control of the power states of memory modules within system local memory 18. Cores 12A and 12B provide instruction execution and operation on data values for general-purpose processing functions. Bridge 16, as well as other bridges within the system provide communication over wide buses with other processor groups and bus 5 provide connection of processors 13A-D, bridge 16, peripherals 15, L3 cache 17 and system local memory 18. Other global system memory may be coupled external to bridge 16 for symmetrical access by all processor groups. Service processor 19A and 19B are connected to processors 13A-D via a Joint Test Action Group (JTAG) test port interface that has command and logic extensions providing very facile control of processors 13A-D.

Within system local memory 18, a virtual machine monitor program, or "hypervisor" provides support for execution of multiple virtual machines (VMs) or "partitions" that each provide an execution environment for an operating system and a number of "guest" programs (applications and services executed by an operating system and running in the associated VM). The operating systems support allocation of memory to their guest applications and the pointers returned from allocation requests are pointers to virtual memory. Although the operating systems typically allocate any requested size of memory, allocation of physical memory is performed in page size increments and the allocation routines manage the allocation of smaller virtual memory blocks from an allocated page. However, operation of the present invention can be applied to memory blocks other than page sized blocks and therefore the present invention should be understood to extend to memory blocks of any size.

Physical memory space with respect to the present invention is not actual machine memory, but is a virtualized machine memory within each VM that is used to provide generally a zero-based emulation of an actual machine memory hardware environment. Generally, the physical memory space as presented to each VM will be smaller than the total actual machine memory present, as opposed to virtual memory space which is typically larger that the machine memory space.

Machine memory space with respect to the present invention may be actual hardware memory space, or may itself be virtualized by either the hypervisor or hardware such as memory controller 14 or an external memory controller such as a controller within system local memory 18 to provide an apparently contiguous machine memory. Such a scheme may unify system local memory 18 with memory located beyond bridge 16 in other processor groups, or may not.

The present invention presents a mechanism for handling the impact of limited availability (such as memory with longer access times) or unavailability of machine memory pages on the processing system. A machine memory page may become unavailable due to a failure detected in one or more memory locations, e.g., a parity check detects a fault at a machine memory location or a system monitor determines that an entire memory module has failed. Another manner in which a machine memory page may become unavailable is due to power management hardware or software control mechanisms placing the module in a powered-down state or in a power-saving state in which system policy dictates that the module cannot be accessed. In other words, the memory module has been effectively taken "off-line". The present invention also provides mechanisms for handling situations where a memory is placed into a power-managed state that retains the contents of the memory, but forces accesses to the memory to incur an additional latency (such as the time required to synchronize a memory module in self-refresh state to the memory bus).

The above-incorporated patent applications describe both hardware and software control mechanisms that enforce system and/or local power management policies so that the hypervisor may have no control of whether or not a memory module is slowed down or taken off-line, and may not have control of the timing of such events. Finally, the hypervisor itself may be required to enforce system or local power management policies (for example due to a customer power or memory space requirement) and thus make a machine memory module unavailable. In some of the above cases, it is necessary to take action to prevent the unavailability of one or more machine memory pages from causing a catastrophic failure of the overall processing system.

The above-mentioned problems can be avoided through one or more of three mechanisms: 1) the hypervisor may silently remap/relocate memory pages if the contents are available or recover the contents of memory from other storage such as a disk page cache; 2) the operating system and/or guests in VMs can be notified of the page unavailability via an exception (or soft checkstop) or other notification mechanism; or 3) the affected VMs can be shut down (via a hard checkstop and cleanup by the hypervisor or via a shutdown notification). In order to take action on affected VMs, it is necessary to know which VMs are affected and in order to notify a VM of a particular page unavailability (e.g., to indicate fault location), it is necessary to determine the physical page number of an unavailable machine page in each of the affected VMs. The present invention uses a reverse mapping technique to determine both the affected VMs and the associated physical page number(s) for the affected VMs for the unavailable machine page.

Figure 2:
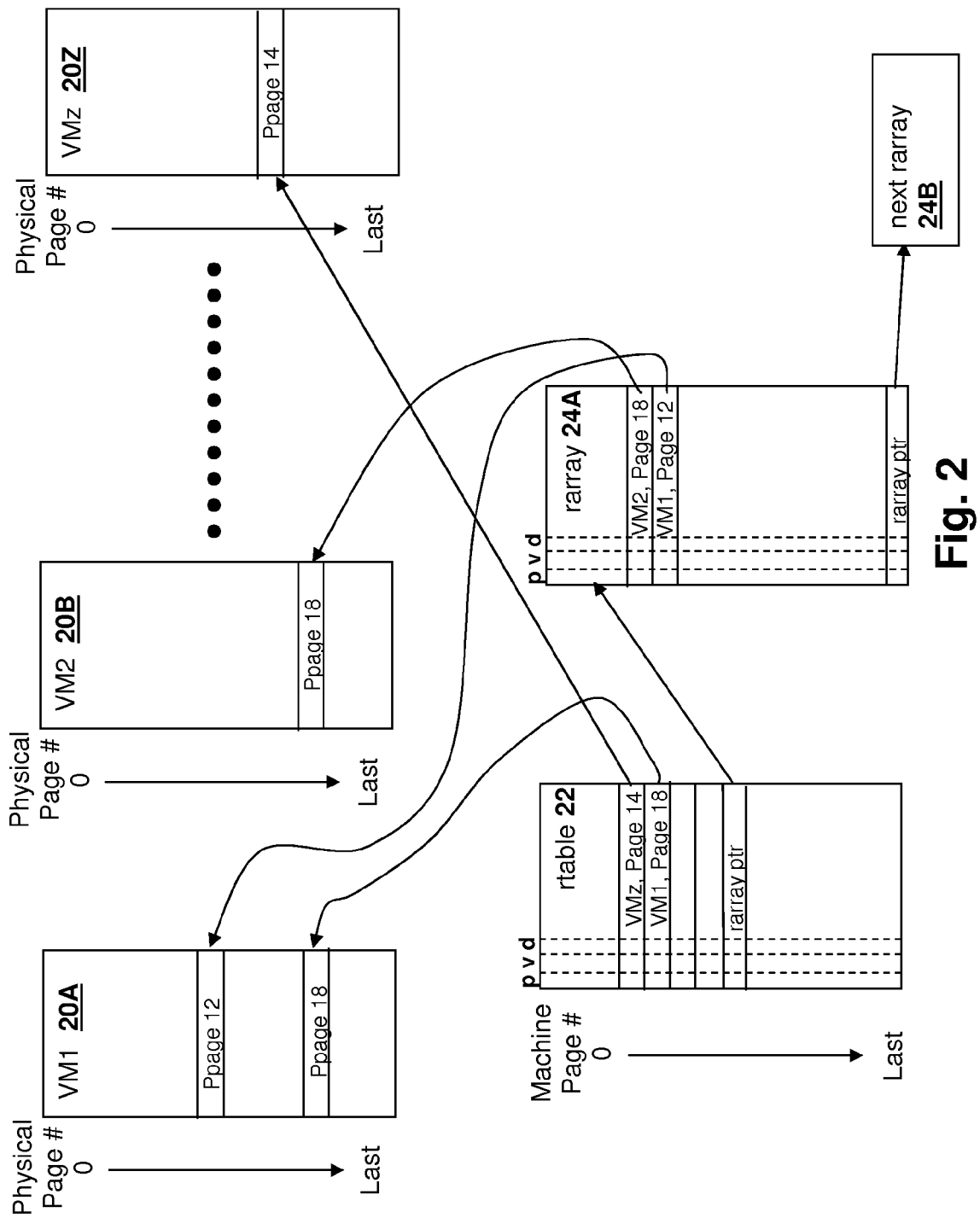
FIG. 2 is a block diagram of a system memory image in accordance with an embodiment of the present invention.

Referring now to FIG. 2, a block diagram is shown depicting memory organization within a computer system in accordance with an embodiment of the present invention. A plurality of VMs 20A-20Z are shown, each having a zero-based physical memory space that can be internally virtualized by operating systems running in VMs 20A-20Z. For illustration, several physical pages (Ppage xx) are shown within the physical memory spaces. The present invention uses a structure 22, referred to as an rtable, that contains a location for each machine memory page. Each machine memory page that is implicated by an allocation in any of VMs 20A-20Z is reflected by a valid entry in rtable 22. Entries may be one of two types: private or shared. A bit is provided in the entries to indicate private or shared status. For a page that is private to a single physical page allocation in a particular one of VMs 20A-20Z, the entry is a physical page number for the particular VM. For example, the first entry shown in rtable 22 is physical page 14 in VM 20Z and the second entry in rtable 22 is physical page 18 in VM 20A. However, the hypervisor generally shares machine memory pages that are identical via detection of this condition by several mechanisms (e.g., background content hashing and disk cache page observation) and a machine memory page may correspond to several physical memory pages in one or more VMs. When a machine memory page is shared, the entry contains a pointer to a structure 24A referred to as an rrarray, that contains entries that include a VM identifier and physical page number for each reference to the machine memory page corresponding to the rtable 22 entry having the rarray 24A pointer. The size of the rarray is chosen to correspond to the expected number of page share references and if a machine page is referenced by a greater number of physical pages, the last entry in rarray 24A is flagged as a pointer to a next rarray 24B, providing a linkage to an extensible amount of storage for references to the machine memory page.

Flag bits p,v, and d are provided within the entries in rtable 22 and rarrays 24A-B that indicate the status of the entries. First, the private/shared flag bit p described above is provided to indicate whether the entry directly contains a single reference to the machine memory page or a pointer to an rtable containing multiple references. Second, a valid bit v is used to indicate whether or not the entry is a valid entry corresponding to an allocated machine page, as deallocation of mappings leaves unused entries in the rtable. Finally, a flag bit d that indicates whether or not the page is discardable is included. Because all rarray entries are shared, the private/shared flag bit p within the rarray is used as an indicator whether or not the last entry in the rarray is a pointer to a next rarray or an entry containing direct reference information.

The reference information contained in the rtable and rarray entries is a VM identifier and a physical page number for the reference. Using page numbers rather than pointers provides for reduced size of the rtable and rarrays, as well as reduced access time/complexity, as a single pointer-sized location can often store all of the flags, VM identifier and physical page number. As the hypervisor allocates and deallocates machine memory to the VMs, it maintains the reverse mapping table, adding or removing entries as needed. When a fault is detected, or a power management change makes a memory module unavailable or only available at an increased latency, the hypervisor looks up the entries for the implicated machine memory pages to determine the affected VMs and the physical page number(s) for each machine page in the affected VMs. The hypervisor can remap/recover the physical page(s) for each VM, can then stop the affected VMs, notify the affected VMs or attempt notification and then stop the VM if no response is received.

The reverse mapping update mentioned above is performed by the hypervisor in the following manner:

Page-out/discard—free the referenced rarray entry and reset valid bit

Map to New VM—change VM Id and physical page number in entry

Convert from Private to Shared—allocate an rarray, place pointer in entry, transferring old private reference to rarray, set shared bit.

Add a reference to shared page—if room in last rarray, add new reference, if no room, allocate new rarray and place pointer in last entry of last rarray Remove a reference from shared page—invalidate reference in rarray. Compact rarray chain if invalid reference makes a chained rarray unnecessary.

Conversion from Shared to Private—deallocate rarray, transferring surviving entry to rtable private entry.

Figure 3:
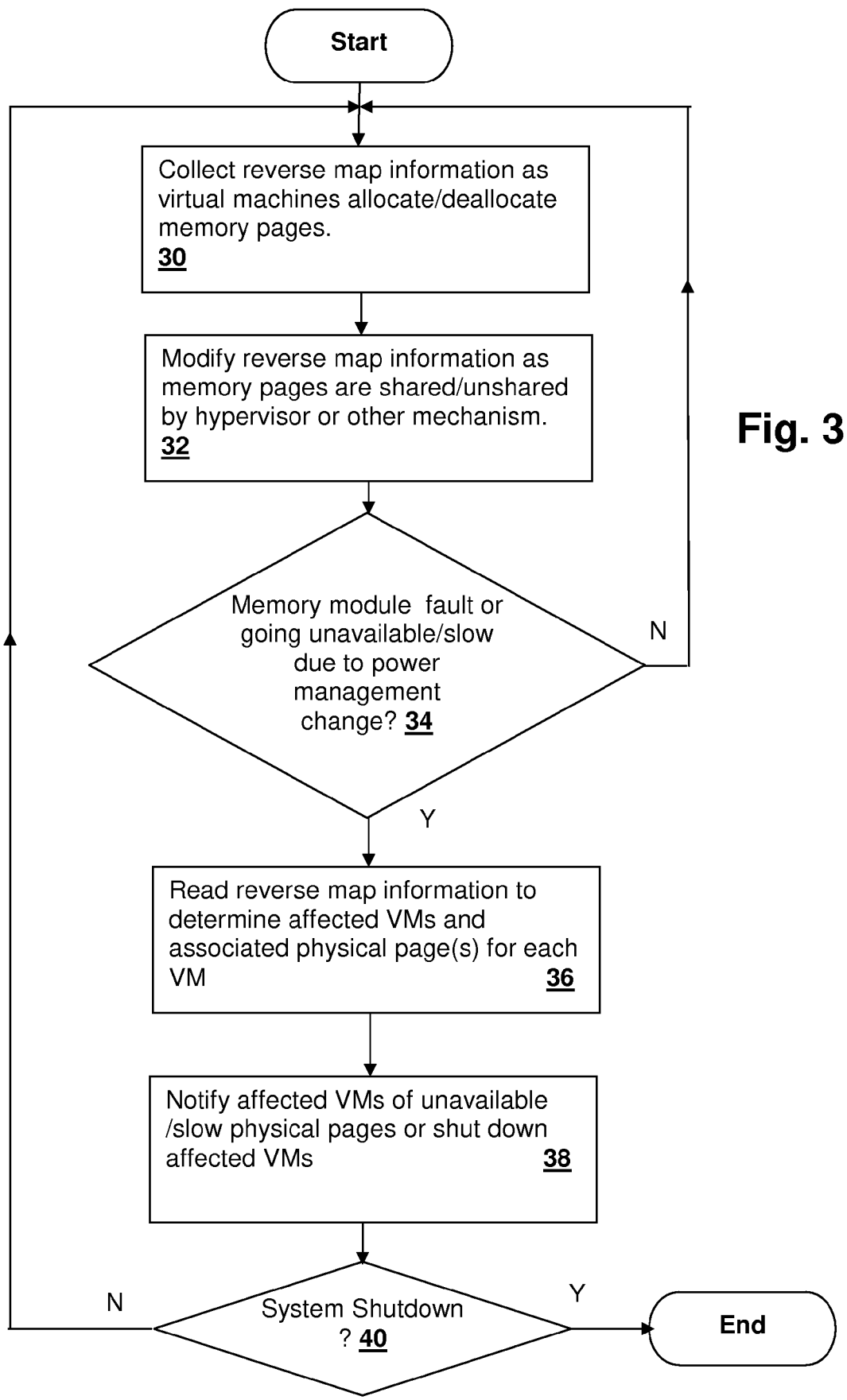
FIG. 3 is a flowchart depicting a method in accordance with an embodiment of the present invention.

Referring now to FIG. 3, a method in accordance with an embodiment of the invention is depicted. The hypervisor collects reverse map information as virtual machines allocate and deallocate memory pages (step 30). If memory pages are shared/unshared by the hypervisor or some other mechanism such as the deallocation/allocation of step 30, the reverse map information is modified to reflect the changed share status (step 32). If a memory module fault is detected or a power management change will take or has taken a memory module off-line or has placed the module in an increased-latency state (decision 34), then the reverse map information is read to determine the affected VMs and associated physical page(s) for each VM (step 36) and the affected VMs are notified of unavailable physical memory pages or are shut down (step 38). The process above is repeated from step 30 until the system is shut down (step 40).

While the invention has been particularly shown and described with reference to the preferred embodiment thereof, it will be understood by those skilled in the art that the foregoing and other changes in form, and details may be made therein without departing from the spirit and scope of the invention.

What is claimed is:

1. A processing system comprising:
   a memory for storing program instructions and data;
   a processor for executing said program instructions, said program instructions including multiple operating systems executing within multiple virtual machines, wherein said program instructions further comprise hypervisor program instructions for managing said virtual machines, and wherein said hypervisor program instructions comprise program instructions for
      maintaining a reverse mapping structure that maps machine memory blocks within said processing system to physical memory blocks used within each virtual machine, said reverse mapping structure containing an indication for each active machine memory block of each virtual machine using said active machine memory block and one or more associated physical memory blocks within each virtual machine;
      determining that a particular machine memory block is physically unavailable for access due to a power management state change or a hardware failure;
      responsive to determining that said particular machine memory block is physically unavailable for access, reading said reverse mapping structure for each of said virtual machines, to determine a set of affected virtual machines that are using said particular machine memory block and associated physical memory blocks; and
      preventing further failure within said processing system due to said physical unavailability of said particular machine memory block by taking preventative action for each of said set of affected virtual machines.

2. The processing system of claim 1, wherein said physical memory blocks are physical memory pages and said machine memory blocks are machine memory pages.

3. The processing system of claim 1, wherein said hypervisor program instructions further comprise program instructions for receiving an indication of a detected machine memory failure within said processing system, and wherein said hypervisor program instructions for determining determine that said particular machine memory block is physically unavailable due to said machine memory failure.

4. The processing system of claim 3, wherein said hypervisor program instructions for taking preventative action comprise program instructions for notifying said affected virtual machines of said machine memory failure including providing an indication of associated physical memory blocks for each affected virtual machine in conjunction with said notification.

5. The processing system of claim 3, wherein said hypervisor program instructions for taking preventative action comprise program instructions for shutting down said affected virtual machines.

6. The processing system of claim 1, wherein said hypervisor program instructions further comprise program instructions for for receiving a notification that said particular machine memory block is being placed in a power-saving state, and wherein said hypervisor program instructions for determining determine that said particular machine memory block is physically unavailable in response to receipt of said notification.

7. The processing system of claim 6, wherein said power-saving state is a high-latency state, whereby said physical unavailability is due to a longer latency for access to said particular machine memory block.

8. The processing system of claim 6, wherein said hypervisor program instructions for taking preventative action comprise program instructions for notifying said affected virtual machines of physical unavailability of said associated physical memory blocks in response to receipt of said notification.

9. The processing system of claim 6, wherein said hypervisor program instructions for taking preventative action comprise program instructions for shutting down said affected virtual machines.

10. The processing system of claim 6, wherein said hypervisor program instructions for taking preventative action comprise program instructions for:
    filling another machine memory block with contents that are identical to the proper contents of said particular machine memory block; and
    remapping said particular machine memory block to said other machine memory block.

11. A computer program product comprising computer-readable storage media encoding program instructions for execution within a processing system supporting execution of multiple operating system images executing within multiple virtual machines, wherein said program instructions comprise hypervisor program instructions for managing said virtual machines, and wherein said hypervisor program instructions comprise program instructions for:
    maintaining a reverse mapping structure that maps machine memory blocks within said processing system to physical memory blocks used within each virtual machine, said reverse mapping structure containing an indication for each active machine memory block of each virtual machine using said active machine memory block and one or more associated physical memory blocks within each virtual machine;
    determining that a particular machine memory block is physically unavailable for access due to a power management state change or a hardware failure;
    responsive to determining that said particular machine memory block is physically unavailable for access, reading said reverse mapping structure for each of said virtual machines, to determine a set of affected virtual machines that are using said particular machine memory block and associated physical memory blocks; and
    preventing further failure within said processing system due to said physical unavailability of said particular machine memory block by taking preventative action for each of said set of affected virtual machines.

12. The computer program product of claim 11, wherein said physical memory blocks are physical memory pages and said machine memory blocks are machine memory pages.

13. The computer program product of claim 11, wherein said hypervisor program instructions further comprise program instructions for receiving an indication of a detected machine memory failure within said processing system, and wherein said hypervisor program instructions for determining determine that said particular machine memory block is physically unavailable due to said machine memory failure.

14. The computer program product of claim 13, wherein said hypervisor program instructions for taking preventative action comprise program instructions for notifying said affected virtual machines of said machine memory failure including providing an indication of associated physical memory blocks for each affected virtual machine in conjunction with said notification.

15. The computer program product of claim 13, wherein said hypervisor program instructions for taking preventative action comprise program instructions for shutting down said affected virtual machines.

16. The computer program product of claim 11, wherein said hypervisor program instructions further comprise program instructions for for receiving a notification that said particular machine memory block is being placed in a power-saving state, and wherein said hypervisor program instructions for determining determine that said particular machine memory block is physically unavailable in response to receipt of said notification.

17. The computer program product of claim 16, wherein said power-saving state is a high-latency state, whereby said physical unavailability is due to a longer latency for access to said particular machine memory block.

18. The computer program product of claim 16, wherein said hypervisor program instructions for taking preventative action comprise program instructions for notifying said affected virtual machines of physical unavailability of said associated physical memory blocks in response to receipt of said notification.

19. The computer program product of claim 16, wherein said hypervisor program instructions for taking preventative action comprise program instructions for shutting down said affected virtual machines.

20. The computer program product of claim 11, wherein said hypervisor program instructions for taking preventative action comprise program instructions for:
    filling another machine memory block with contents that are identical to the proper contents of said particular machine memory block; and
    remapping said particular machine memory block to said other machine memory block.

\* \* \* \* \*